Figure 8:
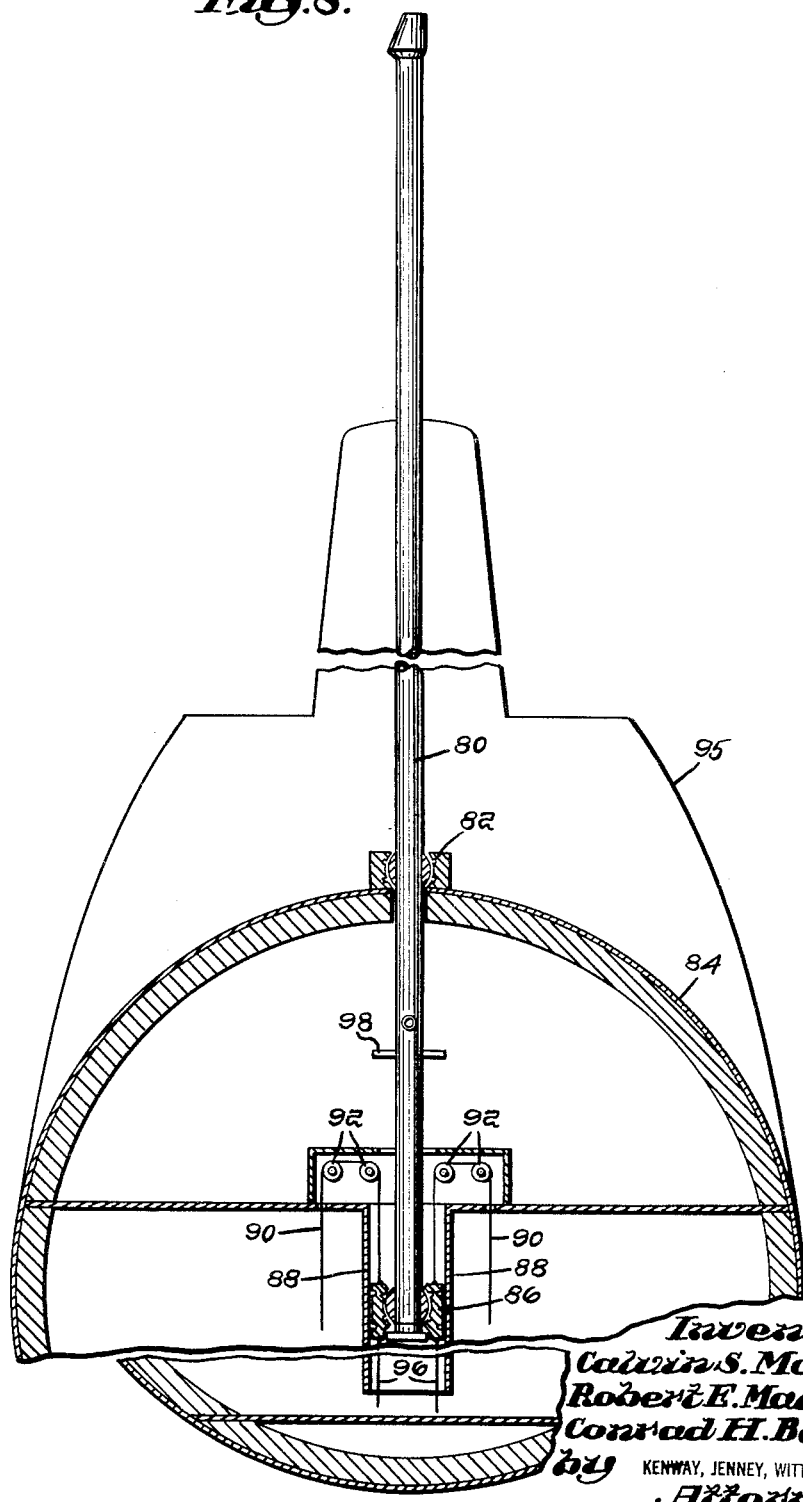

Sept. 5, 1961 C. S. MORSER ET AL 2,998,999
SELF-ALIGNING SHAFT AND HYDROSTATIC BEARINGS ASSEMBLY
Filed Dec. 5, 1958 6 Sheets-Sheet 1
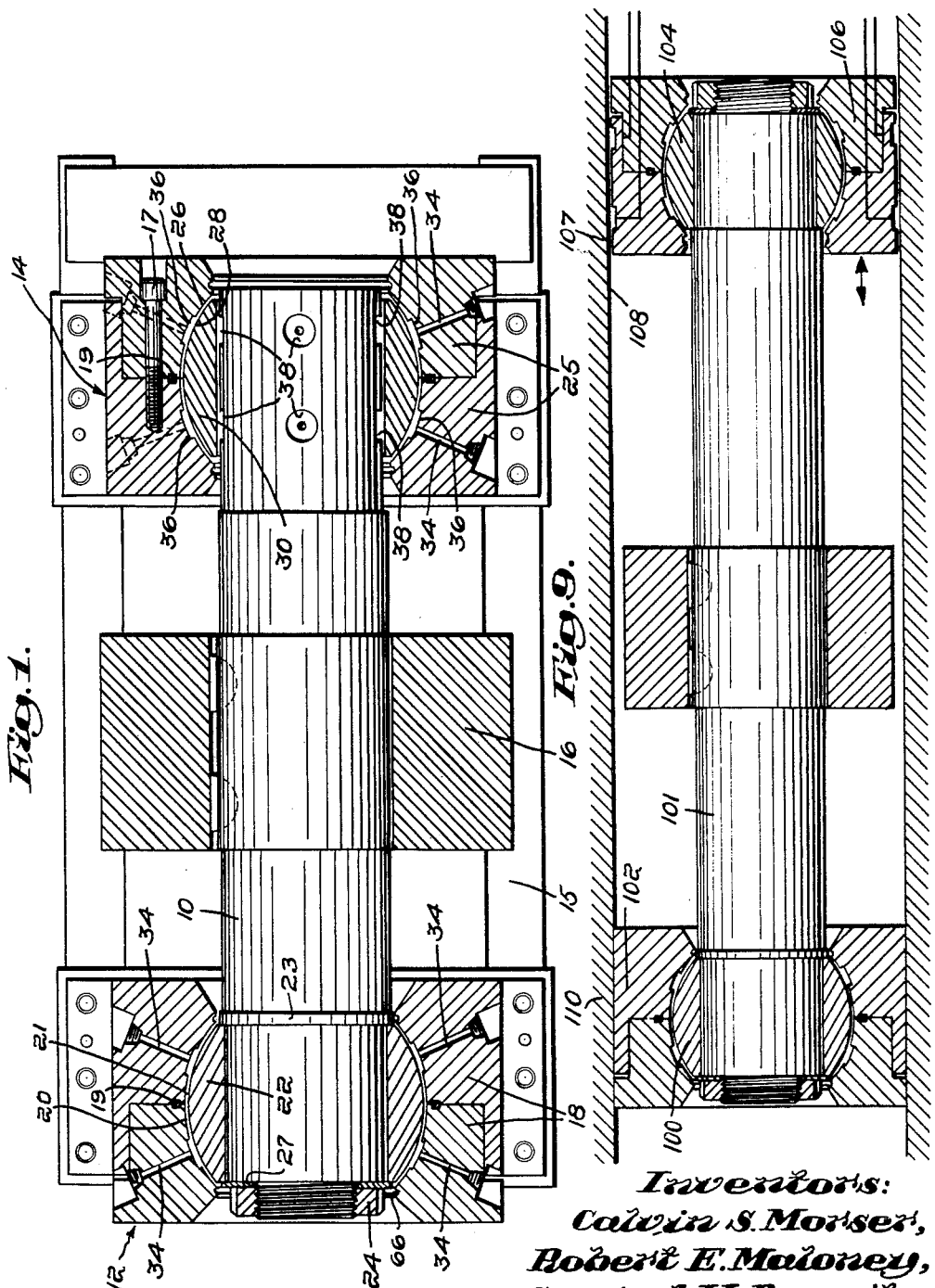
Inventors:
Calvin S. Morser,
Robert E. Maloney,
Conrad H. Benoit,
by KENWAY, JENNEY, WITTER & HILDRETH
Attorneys

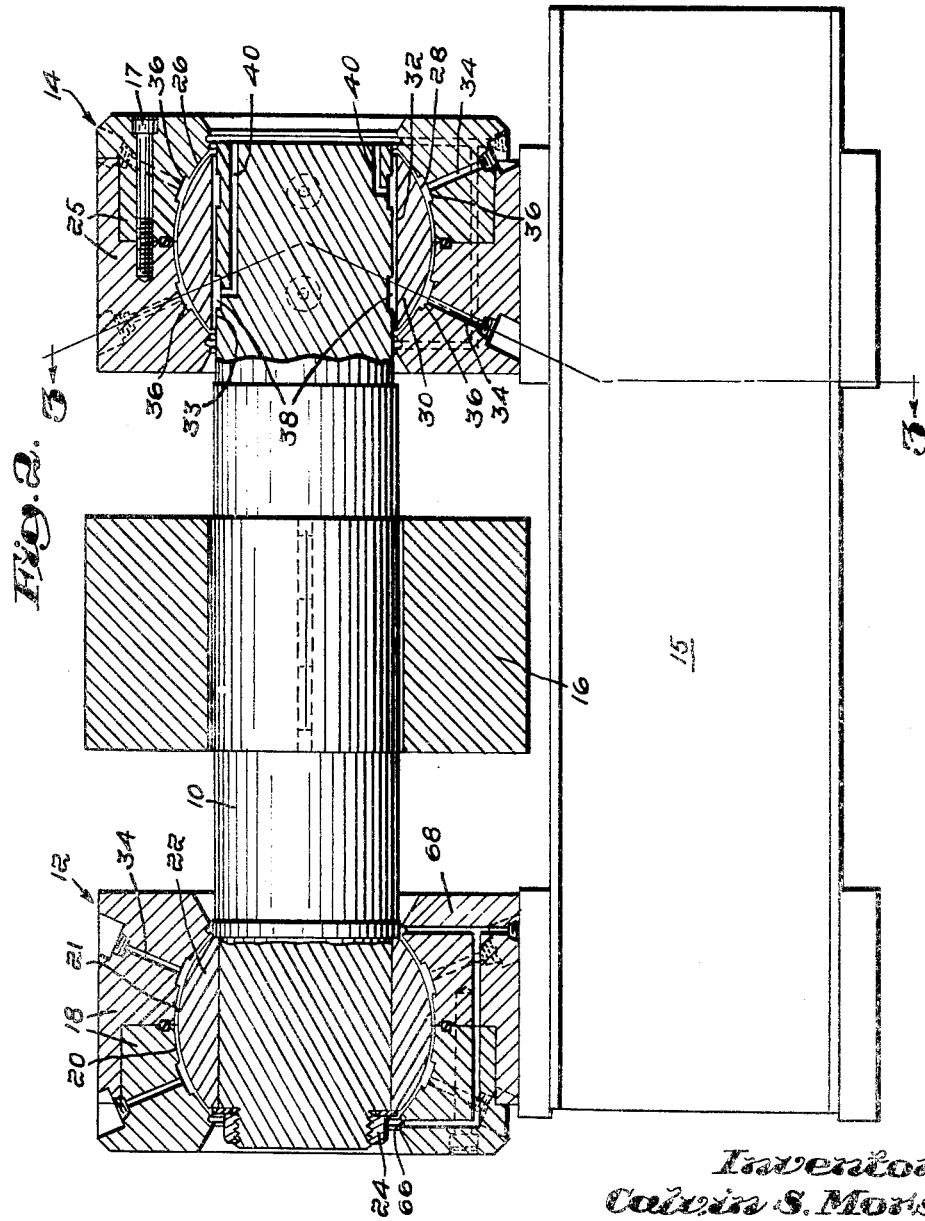

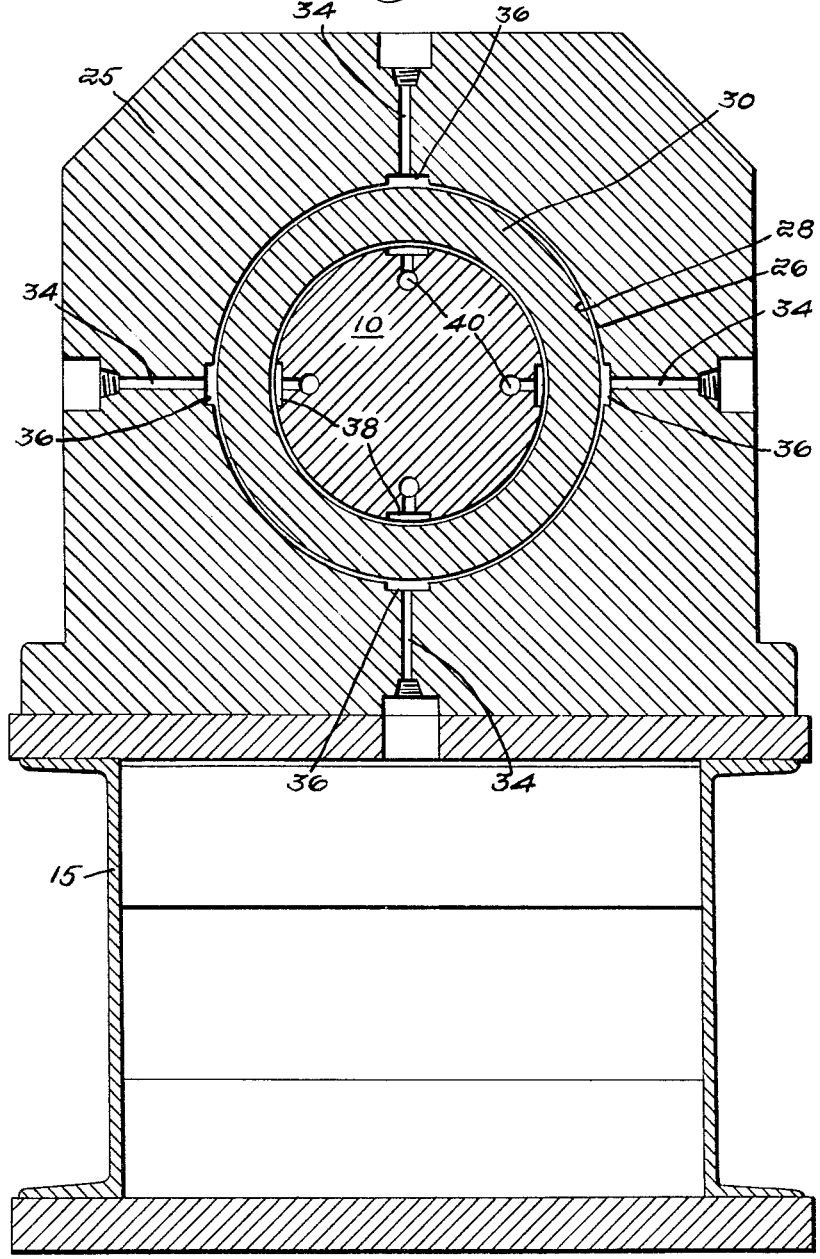

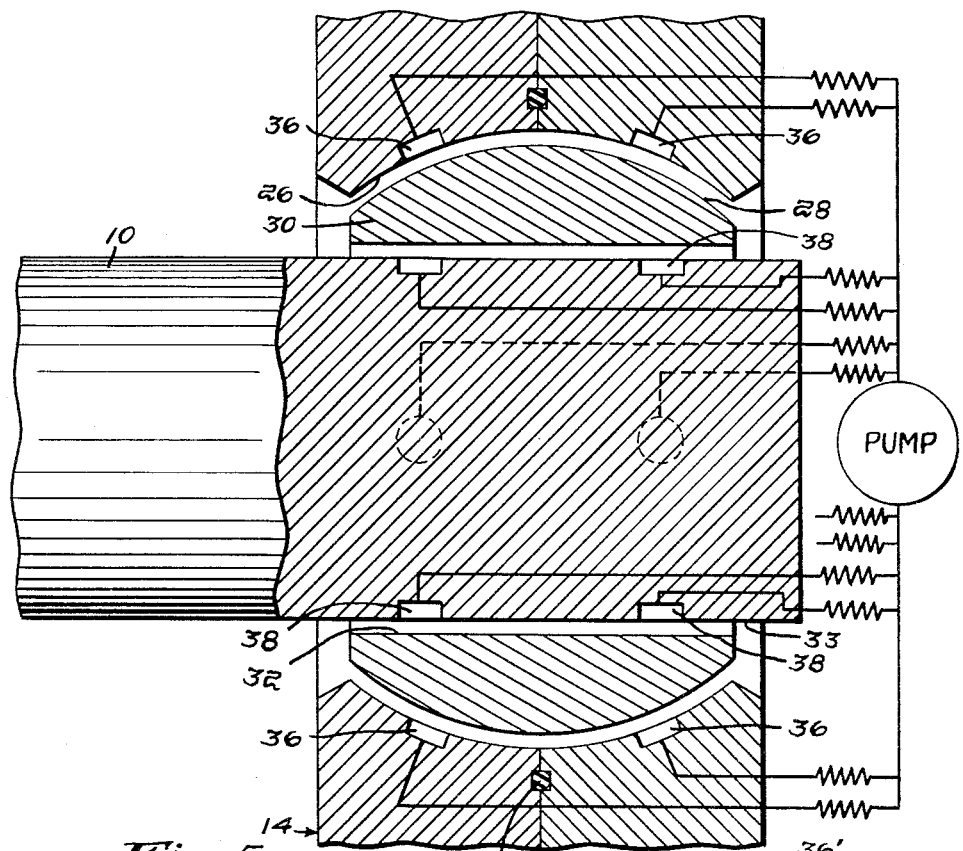
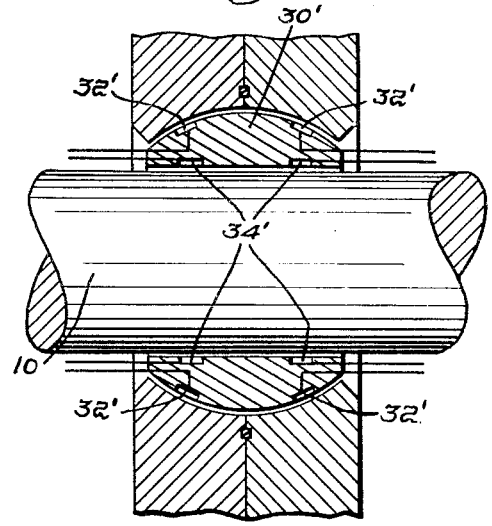
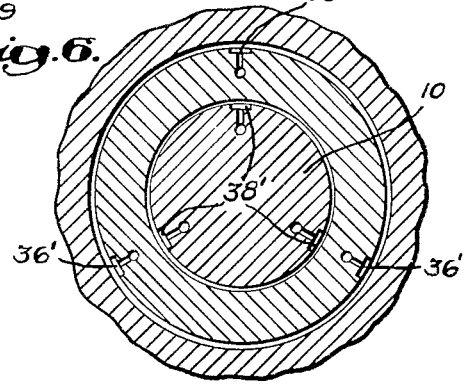

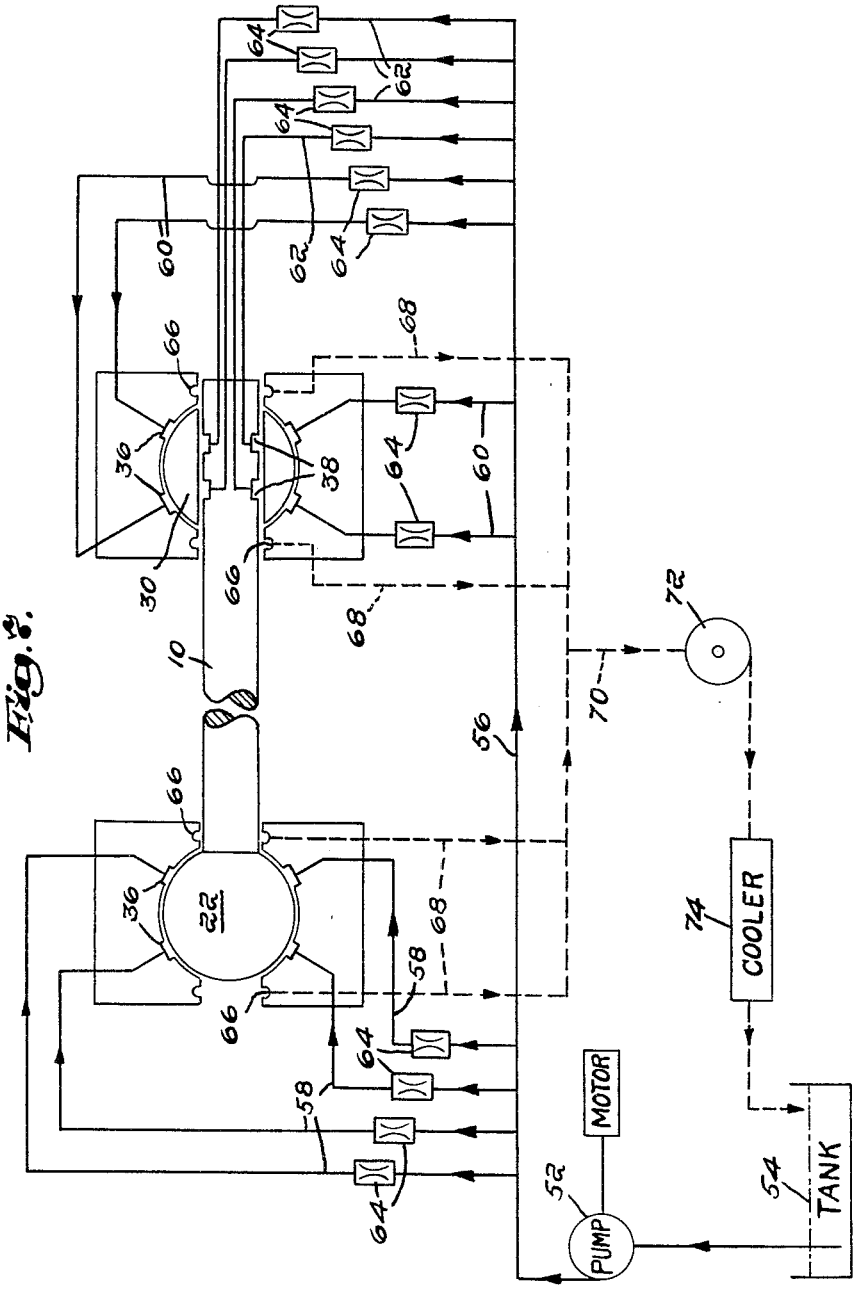

Sept. 5, 1961  C. S. MORSER ET AL  2,998,999
SELF-ALIGNING SHAFT AND HYDROSTATIC BEARINGS ASSEMBLY
Filed Dec. 5, 1958  6 Sheets-Sheet 6

Inventors:
Calvin S. Morser,
Robert E. Maloney,
Conrad H. Benoit,
by KENWAY, JENNEY, WITTER & HILDRETH
Attorneys United States Patent Office 2,998,999
Patented Sept. 5, 1961

2,998,999
SELF-ALIGNING SHAFT AND HYDROSTATIC
BEARINGS ASSEMBLY
Calvin S. Morser, Wellesley, Robert E. Maloney, Stoughton, and Conrad H. Benoit, Dedham, Mass., assignors, by mesne assignments, to Northrop Corporation, Beverly Hills, Calif., a corporation of California
Filed Dec. 5, 1958, Ser. No. 778,420
6 Claims. (Cl. 308—122)

This invention relates particularly to a novel and improved shaft and bearing assembly having large radial and axial load capacities and embodying hydrostatic bearings providing extremely low friction characteristics and rendering the assembly capable of accommodating marked misalignment. The assembly embodies a load supporting shaft in turn supported in self-aligning hydrostatic bearings permitting relative universal movement between the shaft and bearings and operative automatically to center the shaft and maintain its alignment in the bearings. The production of a novel assembly of this nature as and for the purpose described comprises the primary object of the invention.

The assembly embodies spaced ball and socket hydrostatic bearings rotatably supporting and permitting angular movement of the shaft in the bearings, together with mated cylindrical bearing surfaces coaxial of and rotatably supporting the shaft at one of the ball and socket bearings and permitting free rotation and relative movement axially of the shaft. As thus constructed the assembly supports the shaft for free rotation and universal angular movement in the bearings and the cylindrical bearing surfaces adapt the assembly automatically to compensate for any lateral distortion of the shaft.

In a preferred form of the invention the ball of one bearing is fixed to the shaft and the shaft is disposed for rotation and movement axially within the ball of the other bearing, thus permitting free rotation and self alignment of the shaft within the bearings and maintaining extremely low frictional characteristics while carrying heavy radial and axial loads. The low friction characteristics are provided by the maintenance of a continuous flow fluid film under pressure between the shaft and the ball and bearing assemblies which serve to float the load supporting assemblies on the fluid film with no metal to metal contact. The production of a novel assembly of this nature comprises a further object of the invention.

These and other features of the invention will be best understood and appreciated from the following description of preferred embodiments thereof selected for purposes of illustration and shown in the accompanying drawings in which:

FIG. 1 is a sectional plan view through a shaft and bearing assembly embodying the invention, FIG. 2 is a vertical sectional view thereof, FIG. 3 is a sectional view taken on line 3—3 of FIG. 2, FIG. 4 is an enlarged schematic sectional view of a bearing shown in FIG. 3.

FIG. 5 is a fragmentary sectional view axially through the hydrostatic bearing and illustrating a modified construction, FIG. 6 is a sectional view like FIG. 3 but showing a modified construction, FIG. 7 is a schematic view showing the fluid pressure supply system to the hydrostatic bearings, FIG. 8 is a fragmentary sectional view illustrating the application of the invention to the supporting of a submarine periscope, and FIG. 9 is a view similar to FIG. 1 and showing a modified construction.

In FIGS. 1–4 of the drawings we have illustrated the invention as embodying a heavy steel shaft 10 rotatably supported in spaced hydrostatic bearings 12 and 14 on a base 15, and a typical load-carrying unit at 16 on the shaft between the bearings. Both bearings are of the ball and socket type permitting universal angular movement of the shaft in the bearing supports, and each bearing support comprises two complementary halves secured together as by bolts 17 and sealed at their junction by an O-ring 19.

The bearing 12 functions as a thrust bearing supporting the shaft against axial movement. This bearing comprises an outer bearing support 18 surrounding one end of the shaft and having an internal spherical surface 20 in minutely spaced relation from a like external spherical surface 21 on an annular ball member 22 fixed to the shaft as by and between a shoulder 23 integral with the shaft and a nut 24, the nut seating against a washer 27 overlapping the outer end of the ball member 22. The combined units comprise a ball and socket joint supporting the shaft for free rotation and universal angular movement but not axial movement.

The bearing 14 comprises an outer bearing support 25 surrounding the other end of the shaft and having an internal spherical surface 26 in minutely spaced relation from a like external spherical surface 28 on an annulus 30 surrounding the shaft. The annulus 30 has an internal cylindrical surface 32 in minutely spaced relation from a like external cylindrical surface 33 on the shaft and permitting relative axial movement of the shaft within the annulus. The combined units comprise a ball and socket joint supporting the shaft for free universal angular movement within the support 25 and for free rotation and axial movement within the annulus 30.

The shaft is supported in both bearings 12 and 14 on films of oil maintained by controlled pressures and flow rates within the clearances of the spaced bearing surfaces above described, thus effectively floating the shaft on oil with no metal to metal contact in the bearings. As thus supported and centrally located within the bearings, the shaft has freedom of rotation and universal angular movement with a minimum of friction, all as hereinafter more specifically described.

Disposed within and through each bearing support 18 and 25 are eight ports or passageways 34 arranged in pairs 90° apart, as illustrated in FIG. 3, and disposed equal distances at opposite sides of a plane passing right-angularly through the shaft and centrally through the bearing, as illustrated in FIGS. 1 and 2. Each port terminates in a pocket recess 36 at the internal spherical surface of the support. Eight like pockets 38 arranged in like manner are disposed within the shaft (FIGS. 2 and 4) at its cylindrical bearing surface 33 within the annulus 30. Ports 40 extend axially and laterally through the shaft to these pockets, as illustrated in FIGS. 2 and 4. Oil is forced through all these ports under controlled pressure and/or metered flows to the spherical and cylindrical bearing surfaces through a circulating system illustrated in FIG. 7 and hereinafter described. A typical load-carrying unit 16 is illustrated as mounted on a cylindrical portion of the shaft intermediately between he bearings 12 and 14.

The clearances between the above described bearing surfaces are extremely small and thus permit slow and generally uniform flow of fluids, such as oil, water, air or other liquids and gases, therethrough under high pressure from the ports 34 and 40. The clearance employed generally ranges between .001″ and .005″ depending upon various factors, such as the bearing load, fluid viscosity and the pressures employed. In any event the flow is so controlled and/or metered at opposite sides of the shaft and balls that the resulting pressures at the opposing pockets automatically maintain the shaft and balls centered in their respective bearings. In FIG. 7 we have illustrated schematically a fluid circulating system for providing such controlled flow of fluid lubricant under pressure to the ports 34 and 40, and this system together with the functions accomplished will now be described.

The circulating system illustrated in FIG. 7 for supplying oil to the hydrostatic bearings includes a motor operated pump 52 disposed to pump oil under pressure from a tank 54 through a main pipe line 56. Pipes 58 from the line 56 distribute the oil to the ports 34 and pockets 36 of the bearing 12. Pipes 60 from the line 56 distribute the oil to the ports 34 of the bearing 14. Pipes 62 from the line 56 distribute the oil to the ports 40 and pockets 38 in the shaft 10.

In each of the pipes 58, 60 and 62 is a flow control valve 64 which can be set to maintain the metered flows required in the ports 34 and 40, it being understood that other flow restriction means, such as orifice, capillary, etc. can be employed if desired. The oil is forced from these ports through the bearing clearances and outwardly to collecting or scavenging troughs 66 which are connected by pipes 68 to a return pipe 70. A pump 72 in the pipe 70 is adapted to return the oil through a cooler 74 to the tank 54.

The centered position of the shaft 10 and balls 22 and 30 in the bearings 12 and 14 is maintained by virtue of the fact that the flow control valves 64 are adjusted normally to provide equal rates of fluid flow to opposite sides of the shaft and balls. Should a variation in external load displace the shaft radially, thus reducing the clearance on one side of the shaft and/or ball and, conversely, increasing the clearance diametrically opposite thereto, the fluid flow through the valves 64 suppling the smaller clearance area will remain constant and result in an increase in the pressure within such area. The increased pressure within the reduced clearance area, including the pocket recesses, thereupon tends to re-center the shaft. Exactly the reverse condition occurs on the opposite side of the shaft wherein the increased clearance area, while maintaining constant fluid flow results in reduced pressure within the increased clearance area, thereupon tending to recenter the shaft. Consequently, any load variation applied to the shaft results in pressure variations, both positive and negative, in the annular clearance area which combine and tend automatically to re-center the shaft or balls in their respective bearing bores. The shaft and balls are thus automatically centered in the bearings and in such position they are literally floating on oil with no metal to metal contact occurring between the shaft and balls and their bearing bores. Since the only resistance to shaft rotation is the shear of the supporting fluid, the coefficient of friction at relatively low shaft speeds is extremely low and far below that of known rolling element bearings.

While in FIGS. 1–4 we have illustrated the ports 34 and 40 and their pocket recesses 36 and 38 as being within the outer bearing elements 18 and 25 and in the shaft 10, it will be understood that such ports and pockets can be disposed within the annulus 30' as indicated at 32' and 34' in FIG. 5. Also, while in FIGS. 1–4 we have illustrated the pocket recesses 36 and 38 as being disposed in diametrically opposed relation it will be understood that other opposed relations or any combination thereof, as illustrated at 36' and 38' in FIG. 6, are contemplated within the scope of the invention.

While in the combination shown in FIGS. 1 and 2 employing fixed bearing supports 18 and 25 mounted on the base 15 the shaft 10 and bearing 14 will have small relative axial movement, it is apparent that more extensive axial movements of either element is possible within the scope of the invention. For example, in FIG. 8 we have illustrated such use of our invention in the supporting of a submarine periscope. The periscope tube 80 is mounted for axial movement in and through a hydrostatic ball type bearing 82 fixed to the submarine 84 and corresponding to the bearing 14. The bottom end of the tube is supported in a ball type hydrostatic bearing 86 corresponding to the bearing 12. The bearing 86 is fitted to slide within a tubular guide 88 and we have illustrated a system of hoisting cables 90 attached to the bearing 86 and extending over sheaves 92 for elevating the tube axially. The cylindrical guide 88 serves to guide the bearing 86 to permit axial movement of the periscope tube through the bearing 82. Hydrostatic fluid conducting pipes 96, either flexible or telescopic, extend downwardly and outwardly from the bearing 86 and it will be understood that the hydrostatic bearing 82 is also provided with fluid conveying ports of the nature described and illustrated in FIGS. 1–4. The cylindrical portion of the bearing 82 can however be either of the hydrostatic type shown in FIGS. 1–4 or a conventional cylindrical sleeve bearing with sliding contact of the tube within the annulus of the bearing. The tube can be rotated in the bearings by the usual training handles 98.

In FIG. 9 we have illustrated a construction similar to but somewhat modified from that shown in FIG. 1. In this modified construction the ball 100 on the shaft 101 corresponds to the ball member 22 of FIG. 1 and is supported in a fixed bearing 102. A ball 104 fixed to the other end of the shaft is supported in a bearing 106 having an external cylindrical surface 107 coaxial with the shaft and mating with a like internal cylindrical surface 108 of the support 110. The internal and external spherical bearing surfaces are in minutely spaced relation to provide hydrostatic bearings of the nature shown in FIG. 1 and the cylindrical bearing surfaces 107 and 108 are preferably likewise in minutely spaced relation to provide a hydrostatic cylindrical bearing of the nature shown in FIG. 1, thereby permitting only the minimum of friction described. It will be apparent that this assembly supports the shaft for universal movement in both bearings and the cylindrical bearing surfaces permit freedom of movement of the bearing 106 axially of the shaft to automatically compensate for any lateral distortion of the assembly.

Having thus disclosed our invention what we claim as new and desire to secure by Letters Patent is:

1. A self-aligning shaft and bearing assembly comprising in combination, a shaft, a ball and socket hydrostatic bearing supporting one portion of the shaft and embodying a bearing member surrounding said portion of the shaft and having an internal spherical surface in minutely spaced relation from a like external spherical surface on a ball member fixed to said portion of the shaft, a second hydrostatic bearing supporting the shaft in spaced relation therealong from the first named bearing and embodying an internal spherical surface in minutely spaced relation from a like external spherical surface, means for supplying a metered flow of fluid to the clearances between said spaced internal and external spherical surfaces and in opposed relation about the shaft at said bearings, said second hydrostatic bearing further embodying means providing mating internal and external cylindrical bearing surfaces coaxial with the shaft and disposed to support the shaft and permit relative rotation and longitudinal movement of said cylindrical surfaces axially of the shaft, said internal and external cylindrical bearing surfaces being in minutely spaced relation, and means for supplying a metered flow of fluid to the clearances between said spaced internal and external cylindrical surfaces and in opposed relation about the shaft.

2. A self-aligning shaft and bearing assembly comprising in combination, a shaft, a ball and socket hydrostatic bearing supporting one portion of the shaft and embodying a bearing member surrounding said portion of the shaft and having an internal spherical surface in minutely spaced relation from a like external spherical surface on a ball member fixed to said portion of the shaft, a second hydrostatic bearing supporting the shaft in spaced relation therealong from the first named bearing and embodying a bearing member surrounding the shaft and having an internal spherical surface in minutely spaced relation from a like external spherical surface on an annulus surrounding the shaft, the annulus having an internal cylindrical surface disposed about and mating with a like external cylindrical surface on the shaft for supporting and disposed in opposed relation about the shaft, and shaft within the annulus, means for supplying a metered flow of fluid to the clearances between said internal and external spaced spherical surfaces and in opposed relation about the shaft, said means for supplying a metered flow of fluid to the clearance in each hydrostatic bearing comprising a plurality of ports leading into said clearance and disposed in opposed relation above the shaft, and means supporting said ball and socket bearing for axial movement with the shaft relative to said second bearing.

3. The self-aligned shaft and bearing assembly defined in claim 2 plus power operated means connected to the first named bearing member for axially moving the shaft together with the ball and socket bearing.

4. The self-aligned shaft and bearing assembly defined in claim 3 plus means disposed externally of and cooperating with the ball and socket bearing for guiding and maintaining the shaft in axial alignment with the annulus during said axial movement.

5. The self-aligned shaft and bearing assembly defined in claim 4 in which the first named bearing member has an outer cylindrical surface substantially coaxial with the annulus and the last named means includes an inner cylindrical wall mating with said outer cylindrical surface.

6. A self-aligning shaft and bearing assembly comprising, in combination, a shaft, a ball and socket hydrostatic bearing supporting one portion of the shaft and embodying a bearing member surrounding said portion of the shaft and having an internal spherical surface in minutely spaced relation from a like external spherical surface on a ball member fixed to said portion of the shaft, a second hydrostatic bearing supporting the shaft in spaced relation therealong from the first named bearing and embodying an annulus surrounding the shaft and a bearing member surrounding said annulus, said bearing member having an internal spherical surface in minutely spaced relation from a like external spherical surface on said annulus, said annulus having an internal cylindrical surface in minutely spaced relation from a like external cylindrical surface on the shaft and permitting relative rotation and axial movement of the shaft within the annulus, and means for supplying a metered flow of fluid under controlled pressures to the clearances between said internal and external spherical and cylindrical spaced surfaces and in opposed relation about the shaft.

References Cited in the file of this patent

UNITED STATES PATENTS

| 1,906,715 | Penick | May 2, 1933 |

FOREIGN PATENTS

| 559,168 | France | June 9, 1923 |
| 896,233 | France | Feb. 15, 1945 |
| 1,010,334 | Germany | June 13, 1957 |
| 68,461 | France | Nov. 12, 1957 |

UNITED STATES PATENT OFFICE
CERTIFICATE OF CORRECTION

Patent No. 2,998,999 　　　　　　　　　　　September 5, 1961

Calvin S. Morser et al.

It is hereby certified that error appears in the above numbered patent requiring correction and that the said Letters Patent should read as corrected below.

Column 5, line 10, for "disposed in opposed relation about the shaft, and" read -- permitting relative rotation and axial movement of the --.

Signed and sealed this 30th day of January 1962.

(SEAL)
Attest:

ERNEST W. SWIDER　　　　　　　　　　　DAVID L. LADD
Attesting Officer　　　　　　　　　　　　　Commissioner of Patents